US011814536B2

(12) United States Patent
De Wolf et al.

(10) Patent No.: US 11,814,536 B2
(45) Date of Patent: Nov. 14, 2023

(54) FLOOR COATING COMPOSITIONS

(71) Applicant: ALLNEX NETHERLANDS B.V, Bergen op Zoom (NL)

(72) Inventors: Elwin Aloysius Cornelius Adrianus De Wolf, Hoogerheide (NL); Ferry Ludovicus Thys, Stevens-Woluwe (BE); Richard Hendrikus Gerrit Brinkhuis, Zwolle (NL); Ramesh Subramanian, Louisville, KY (US); Michael Anthony Gessner, La Grange, KY (US); Paulus Jozef Dolphijn, Roosendaal (NL); Dirk Emiel Paula Mestach, Nulen (BE)

(73) Assignee: ALLNEX NETHERLANDS B.V., Bergen op Zoom (NL)

( * ) Notice: Subject to any disclaimer, the term of this patent is extended or adjusted under 35 U.S.C. 154(b) by 551 days.

(21) Appl. No.: 16/894,315

(22) Filed: Jun. 5, 2020

(65) Prior Publication Data

US 2020/0299539 A1    Sep. 24, 2020

Related U.S. Application Data

(63) Continuation of application No. 15/563,958, filed as application No. PCT/EP2016/058483 on Apr. 18, 2016, now abandoned.

(60) Provisional application No. 62/148,983, filed on Apr. 17, 2015.

(30) Foreign Application Priority Data

May 28, 2015  (EP) .................................... 15169722

(51) Int. Cl.
| | | |
|---|---|---|
| *C09D 167/02* | (2006.01) | |
| *C04B 41/00* | (2006.01) | |
| *C04B 41/48* | (2006.01) | |
| *C08J 3/24* | (2006.01) | |
| *C08J 5/18* | (2006.01) | |
| *C09D 167/08* | (2006.01) | |
| *C09D 4/00* | (2006.01) | |
| *C04B 111/60* | (2006.01) | |

(52) U.S. Cl.
CPC .......... *C09D 167/02* (2013.01); *C04B 41/009* (2013.01); *C04B 41/4826* (2013.01); *C08J 3/24* (2013.01); *C08J 5/18* (2013.01); *C09D 4/00* (2013.01); *C09D 167/08* (2013.01); *C04B 2111/60* (2013.01)

(58) Field of Classification Search
CPC ...... C09D 167/02; C09D 4/00; C09D 167/08; C04B 41/009; C04B 41/4826; C04B 2111/60; C08J 3/24; C08J 5/18
USPC ........................................................ 524/14
See application file for complete search history.

(56) References Cited

U.S. PATENT DOCUMENTS

| | | |
|---|---|---|
| 2,635,100 A | 4/1953 | Werntz |
| 2,759,913 A | 8/1956 | Hulse et al. |
| 4,217,396 A | 8/1980 | Heckles |
| 4,223,072 A | 9/1980 | Baney et al. |
| 4,408,018 A | 10/1983 | Bartman et al. |
| 4,529,487 A | 7/1985 | Hsu et al. |
| 4,602,061 A | 7/1986 | Akkerman |
| 4,749,728 A | 6/1988 | Craun et al. |
| 4,851,294 A | 7/1989 | Buter et al. |
| 4,871,822 A | 10/1989 | Brindöpke et al. |
| 4,938,980 A | 7/1990 | Arciszewski et al. |
| 5,017,649 A | 5/1991 | Clemens |
| 5,039,720 A | 8/1991 | Saatweber et al. |
| 5,084,536 A | 1/1992 | Brindöpke et al. |
| 5,959,028 A | 9/1999 | Brinkhuis |
| 5,973,082 A | 10/1999 | Elmore |
| 5,990,224 A | 11/1999 | Raynolds et al. |
| 6,201,048 B1 | 3/2001 | Raynolds et al. |
| 6,262,169 B1 | 7/2001 | Helmer et al. |
| 6,265,029 B1 | 7/2001 | Lewis |
| 6,706,414 B1 | 3/2004 | Dammann et al. |
| 6,878,845 B2 | 4/2005 | Sheridan |
| 6,989,459 B2 | 1/2006 | Walker |
| 7,524,435 B2 | 4/2009 | Bernhard |
| 7,851,530 B2 | 12/2010 | Brinkhuis et al. |
| 8,013,068 B2 | 9/2011 | Beckley et al. |
| 8,124,688 B2 | 2/2012 | Meijer et al. |
| 8,569,440 B2 | 10/2013 | Spyrou et al. |
| 8,829,151 B2 | 9/2014 | Meijer et al. |

(Continued)

FOREIGN PATENT DOCUMENTS

| | | |
|---|---|---|
| CN | 86101015 A | 8/1986 |
| CN | 1309683 A | 8/2001 |

(Continued)

OTHER PUBLICATIONS

AZO Materials, "A_Guide_to_Silane_Solutions_Adhesives", Sep. 7, 2012, Internet Article, https://www.azom.com/article.aspx?ArticleID=6777.
T. Jung et al.—Farbe und Lacke Oct. 2003.
The International Search Report of PCT/EP2012/069904.
Braun, D. et al., Polymer Synthesis: Theory and Practice, 4th ed., 2005, pp. 64-66.

(Continued)

*Primary Examiner* — Ling Siu Choi
*Assistant Examiner* — Ronald Grinsted
(74) *Attorney, Agent, or Firm* — HOYNG ROKH MONEGIER B.V.; David P. Owen

(57) ABSTRACT

The invention relates to the use of Real Michael Addition (RMA) crosslinkable composition for the preparation of a floor coating, to special RMA crosslinkable compositions with long working time and very short service time and low VOC and to specific floor compositions, in particular for use in high build floor coating applications.

20 Claims, No Drawings

(56) References Cited

U.S. PATENT DOCUMENTS

| | | | |
|---|---|---|---|
| 8,962,725 | B2 | 2/2015 | Brinkhuis et al. |
| 9,181,452 | B2 | 11/2015 | Brinkhuis |
| 9,181,453 | B2 | 11/2015 | Brinkhuis |
| 9,260,626 | B2 | 2/2016 | Brinkhuis |
| 9,284,423 | B2 | 3/2016 | Brinkhuis |
| 9,534,081 | B2 | 1/2017 | Brinkhuis |
| 9,587,138 | B2 | 3/2017 | Brinkhuis et al. |
| 9,834,701 | B2 | 12/2017 | Brinkhuis et al. |
| 2003/0023108 | A1 | 1/2003 | E. Walker |
| 2003/0195305 | A1 | 10/2003 | Kuo et al. |
| 2004/0072979 | A1 | 4/2004 | Sheridan et al. |
| 2005/0137275 | A1 | 6/2005 | Nefzger et al. |
| 2005/0143575 | A1 | 6/2005 | Bernard |
| 2006/0078742 | A1 | 4/2006 | Kauffman et al. |
| 2009/0143528 | A1 | 6/2009 | Mestach et al. |
| 2009/0226729 | A1 | 9/2009 | Niimoto et al. |
| 2011/0003937 | A1 | 1/2011 | Kontani |
| 2011/0251338 | A1 | 10/2011 | Kim et al. |
| 2013/0053505 | A1 | 2/2013 | Brinkhuis et al. |
| 2013/0210986 | A1 | 8/2013 | Brinkhuis et al. |
| 2013/0317156 | A1 | 11/2013 | Yu |
| 2014/0088233 | A1 | 3/2014 | Kann |
| 2014/0221542 | A1 | 8/2014 | Brinkhuis et al. |
| 2014/0228507 | A1 | 8/2014 | Brinkhuis et al. |
| 2016/0115344 | A1 | 4/2016 | Brinkhuis et al. |

FOREIGN PATENT DOCUMENTS

| | | | |
|---|---|---|---|
| CN | 1637031 | A | 7/2005 |
| CN | 1723242 | A | 1/2006 |
| CN | 1757656 | A | 4/2006 |
| CN | 1816597 | A | 8/2006 |
| CN | 1910234 | A | 2/2007 |
| CN | 1964997 | A | 5/2007 |
| CN | 1976972 | A | 6/2007 |
| CN | 101012291 | A | 7/2007 |
| CN | 101103060 | A | 1/2008 |
| CN | 101107289 | A | 1/2008 |
| CN | 101213230 | A | 7/2008 |
| CN | 101268149 | A | 9/2008 |
| CN | 101869844 | A | 10/2010 |
| CN | 101879457 | A | 11/2010 |
| CN | 102834436 | A | 12/2012 |
| CN | 102834437 | A | 12/2012 |
| CN | 103562328 | A | 2/2014 |
| CN | 103974999 | A | 8/2014 |
| DE | 835809 | A | 4/1952 |
| DE | 3041223 | A1 | 5/1981 |
| EP | 0192304 | A1 | 8/1986 |
| EP | 0198519 | A1 | 10/1986 |
| EP | 0227454 | A2 | 7/1987 |
| EP | 227454 | A2 | 7/1987 |
| EP | 0161697 | B1 | 3/1988 |
| EP | 0310011 | A1 | 9/1988 |
| EP | 0326723 | A1 | 8/1989 |
| EP | 0448154 | A1 | 9/1991 |
| EP | 0501223 | A2 | 9/1992 |
| EP | 0651023 | A2 | 5/1995 |
| EP | 0808860 | A2 | 11/1997 |
| EP | 1541606 | A1 | 12/2004 |
| EP | 1593727 | A1 | 11/2005 |
| EP | 1761582 | | 1/2006 |
| EP | 1513900 | B1 | 2/2006 |
| EP | 1640388 | A2 | 3/2006 |
| EP | 1838747 | | 7/2006 |
| EP | 2072520 | A1 | 6/2009 |
| EP | 1813630 | B1 | 3/2010 |
| EP | 2374836 | A1 | 4/2010 |
| EP | 1641887 | B1 | 10/2010 |
| EP | 1902081 | B1 | 12/2010 |
| EP | 2374836 | A1 | 10/2011 |
| EP | 1641888 | B1 | 2/2012 |
| EP | 2556108 | B1 | 7/2014 |
| EP | 2764035 | A1 | 8/2014 |
| EP | 3085748 | A1 | 10/2016 |
| GB | 1596638 | A | 8/1981 |
| GB | 2093472 | A | 9/1982 |
| GB | 2010879 | A | 7/1997 |
| GB | 2405149 | A | 2/2005 |
| JP | 53141369 | A | 12/1978 |
| JP | H01121376 | A | 5/1986 |
| JP | 62-223204 | A | 10/1987 |
| JP | 01204919 | A | 8/1989 |
| JP | 8501124 | A | 2/1996 |
| JP | 8319437 | A | 12/1996 |
| JP | H1045993 | A | 2/1998 |
| JP | 10330690 | A | 12/1998 |
| JP | 2000119353 | A | 4/2000 |
| JP | 2001505948 | A | 5/2001 |
| JP | 2001-207631 | A | 8/2001 |
| JP | 2001516787 | A | 10/2001 |
| JP | 2001516789 | A | 10/2001 |
| JP | 2002514673 | A | 5/2002 |
| JP | 2002285100 | | 10/2002 |
| JP | 2003522817 | A | 7/2003 |
| JP | 2004018859 | A | 1/2004 |
| JP | 2004211090 | A | 7/2004 |
| JP | 2005-034687 | A | 2/2005 |
| JP | 2005-505653 | A | 2/2005 |
| JP | 2006-089743 | A | 4/2006 |
| JP | 2006525402 | A | 11/2006 |
| JP | 2011-099744 | A | 5/2011 |
| JP | 2011-208371 | A | 10/2011 |
| JP | 2012505926 | A | 3/2012 |
| JP | 2013-091982 | A | 5/2013 |
| JP | 2013-108339 | A | 6/2013 |
| JP | 2013528670 | A | 7/2013 |
| JP | 2014533948 | A | 12/2014 |
| JP | 2015120769 | A | 7/2015 |
| JP | 5910952 | B2 | 4/2016 |
| KR | 100232793 | B1 | 12/1999 |
| NL | 8203502 | A | 4/1984 |
| RU | 2275403 | C2 | 4/2006 |
| RU | 2346016 | C2 | 2/2009 |
| RU | 2415167 | C2 | 3/2011 |
| RU | 2484113 | C2 | 6/2013 |
| RU | 2532909 | C2 | 11/2014 |
| SG | 11201401321 | W | 4/2013 |
| TW | 200613500 | A | 5/2006 |
| WO | 94017148 | A | 8/1994 |
| WO | 9641833 | A1 | 12/1996 |
| WO | 9825989 | A1 | 6/1998 |
| WO | 9914275 | A1 | 3/1999 |
| WO | 9914278 | A1 | 3/1999 |
| WO | 9914279 | A1 | 3/1999 |
| WO | 9958608 | A1 | 11/1999 |
| WO | 0004106 | A1 | 1/2000 |
| WO | 0112708 | A1 | 2/2001 |
| WO | 02053613 | A1 | 7/2002 |
| WO | 2003031502 | A | 4/2003 |
| WO | 03089479 | A2 | 10/2003 |
| WO | 2004035632 | A2 | 4/2004 |
| WO | 2004099329 | A1 | 11/2004 |
| WO | 2005048866 | A2 | 6/2005 |
| WO | 2005104694 | A2 | 11/2005 |
| WO | 2006003044 | A1 | 1/2006 |
| WO | 2006074895 | A1 | 7/2006 |
| WO | 2006075000 | A1 | 7/2006 |
| WO | 2006081079 | A1 | 8/2006 |
| WO | 2007000335 | A1 | 1/2007 |
| WO | 2007002328 | A1 | 1/2007 |
| WO | 2007035255 | A1 | 3/2007 |
| WO | 2008070022 | A1 | 6/2008 |
| WO | 2008157468 | A1 | 12/2008 |
| WO | 2010046240 | A1 | 4/2010 |
| WO | 2011124663 | A1 | 10/2011 |
| WO | 2011124664 | A1 | 10/2011 |
| WO | 2011124665 | A1 | 10/2011 |
| WO | 2012002095 | A | 1/2012 |
| WO | 2012175622 | A1 | 12/2012 |
| WO | 2013050574 | A1 | 4/2013 |
| WO | 2013050622 | A1 | 4/2013 |
| WO | 2013050623 | A1 | 4/2013 |
| WO | WO-2013050622 A1 * | | 4/2013 ......... B01J 31/0205 |

(56) References Cited

FOREIGN PATENT DOCUMENTS

| WO | 2013071012 A2 | 5/2013 |
|---|---|---|
| WO | 2014125589 A | 8/2014 |
| WO | 2005021672 A1 | 10/2014 |
| WO | 2014166880 A1 | 10/2014 |
| WO | 2016054367 A1 | 4/2016 |
| WO | 2016166334 A1 | 10/2016 |
| WO | 2016166361 A1 | 10/2016 |
| WO | 2016166365 A1 | 10/2016 |
| WO | 2016166369 A1 | 10/2016 |
| WO | 2016166371 A1 | 10/2016 |
| WO | 2016166381 A1 | 10/2016 |
| WO | 2016166382 A1 | 10/2016 |
| WO | 2019145472 A1 | 8/2019 |

OTHER PUBLICATIONS

Noomen, Arie: "Applications of Michael addition chemistry in coatings technology", Progress in Organic Coatings, 32 (1997), pp. 137-142.
Krishnadas, Shashikiran et al., "Rapid Setting Epoxy Primer System with the Addition of Blocked Catalyst", Indian Journal of Advances in Chemical Science 2 (2014), pp. 55-60.
Lösungen, Römpp online 4.0, Mar. 1, 2002.
"The Basics of Airless Spraying, Information on Basic Components, Spray Techniques and Safety", 2014.
"ETPPAAc Solutions Ethyltriphenylphosphonium Acid Acetate", Apr. 20, 2007, pp. 1-2.
Brinkhuis, R.; Schutyser, J.; Thys, F.; De Wolf, E.; Buser, T.; Kalis, J.; Magnus, N.; Van Wijk, F. Taming the Michael Addition Reaction. European Coatings Journal 2015, 34-40. (Year: 2015).

\* cited by examiner

FLOOR COATING COMPOSITIONS

The invention relates to floor coating compositions and in particular synthetic resin floorings. In particular it relates to the use of RMA crosslinkable compositions in floor coating compositions, to special RMA crosslinkable compositions, to special resins for use in said floor coating compositions, to floor coating compositions and the processes for making a floor coating using said floor coating compositions.

Floor coating compositions are used to improve appearance and protect the substrate floor mostly from chemical or mechanical exposure. The chemical and mechanical resistance requirements are typically much higher than for paints on other surfaces.

Synthetic resin floorings are being defined as a mixture of synthetic resin and particles (optionally pigments) that hardens on curing by means of chemical reactions. Synthetic resin floorings are applied in-situ to a substrate surface, for example a direct finished concrete slab or fine concrete screed.

Concrete wearing surfaces can give satisfactory service under many industrial conditions but become less effective where there are specific requirements of chemical resistance, hygiene, cleanliness, resistance to high impact or abrasion. Because of this, concrete is often protected by the application of floor coating compositions providing a synthetic resin flooring top layer. The term synthetic resin does not exclude bio-based components.

Synthetic resin floorings can be divided into different types varying in thickness and surface finish; floor sealer, (low build or normal) floor coatings, high build floor coatings and top layer floor coatings. Floor sealers are being used to block moisture in the concrete. They are applied at a dry film thickness up to 150 µm in two or more coating layers. Floor coatings are applied in two or more coating layers at a final thickness of 150-300 µm. High build floor coatings can have a final thickness of up to several millimeters. Often the floor coatings, in particular the high build floor coatings, are flow applied and referred to as 'self-smoothing' or 'self-levelling' flooring. The top layer floor coatings can be applied to protect the lower layers for degradation, to hide defects or to provide decorative effects.

Some resin floorings may be produced with special decorative effects by the incorporation of colored particles or flakes, in particular in the top layer near the surface. Terrazzo-like finishes (ground exposed aggregate) may be produced from certain floorings. Slip resistant or anti-static/conductive versions of all these categories may also be available. Resin floorings may also be produced with particulate fillers like sand or wood chips for decorative purposes or for achieving lower cost.

Synthetic resin floorings comprise three basic ingredients: the base resin, a reactive hardener and a filler, in particular a particulate filler. Some resin floorings may also include additional components such as pigments, surface dressings or coarse aggregate. For all synthetic resin flooring products the setting reaction, by which the initially liquid components are converted into a strong tough polymer, begins only when the base resin and the reactive hardener are intimately mixed.

A variety of different types of synthetic resin systems are available which can form the binder of a flooring system, but the dominant technologies that are currently being used are epoxy-amine and polyol-polyisocyanate. Although these resin systems have their merits, they also pose some important limitations as they use chemicals that have toxicological profiles that are questionable (bisphenol A/F in epoxy resins, amine curing agents, monomeric diisocyanate in polyisocyanate hardeners). Consequently, there is a need for a resin flooring system that has a more favorable toxicological profile.

EP2374836 and WO2014/166880 describe RMA crosslinkable coating compositions, more in particular to catalysts for use in the compositions but disclose nothing specifically re floor coatings nor of the specific polymers or compositions for that purpose.

WO08157468 relates to crosslinked lactam polymers for biodegradable drug delivery gels. Crosslinking is by Michael addition using reactive thiols, not relating to Real Michael addition. Coatings and certainly flooring coatings are not mentioned.

EP808860 describes RMA crosslinkable coating compositions for automotive applications, but disclose nothing specifically re floor coatings nor of the specific polymers or compositions for that purpose.

US2014/008233 describes flooring compositions comprising a polymer blend of polyvinylchloride PVC and polyhydroxyalkanoate PHA, which are not crosslinkable by Michael addition.

WO01/12708 describes polyolefin interpolymer blends with improved ignition temperature that can be shaped to floors, but have nothing to do with coating compositions and are not crosslinkable by Michael addition.

An important parameter for floor coating compositions is the working time. This is the time following mixing of the basic ingredients during which the flooring material can be applied and finished without detrimental effect on its properties such as adhesion, compaction and surface finish. This property is very much linked to the consistency of the flooring material, in particular fluidity characterizes its ease of use. The flooring coatings are usually applied by casting and the flooring composition must be self levelling.

The time before service is the time, counted from the mixing of the basic ingredients, required to attain sufficient crosslinking to develop the required mechanical strength and chemical resistance to withstand the intended exposure, which can be pressure from walking people, from tires of a car, scratch/abrasion resistance, water and oil resistance etc. The desired floor coating properties are in particular a high compressive strength (measured according to DIN EN ISO 604), a high tear strength (measured according to DIN ISO 34-1) and a high tensile strength (measured according to DIN EN ISO 527).

The balance between working time and the time before service is a difficult one as both epoxy-amine and polyol-polyisocyanate systems will start reacting chemically already in the liquid state directly after mixing. This implies that the viscosity of the mixed liquid resin flooring will start to increase, reducing the fluidity and the ability of the resin flooring to flow and level. This difficult balance is exacerbated by the presence of fillers in particular when the amount of filler is high, as is often the case.

The final flooring system, which includes the various successively superimposed layers, typically needs to cure for 1-3 days at 15-20° C. before allowing significant use by traffic and 3 to 7 days at 15-20° C. before allowing contact with chemical agents. At site temperatures below 10° C., cure times will be substantially increased.

There is a great desire to shorten these times. However, all measures that are taken to shorten the time before service, such as the addition of extra catalysts will have also a detrimental effect on the working time. These desires are counteractive.

Furthermore floor coatings will require a relative humidity less than 85% if they are to through-cure satisfactorily. Especially for floorings based on polyol-polyisocyanate, humidity is critical as water can react with the polyisocyanate, generating carbon dioxide gas that can cause foaming and blistering. Therefore there is a need for a resin flooring system that has a long working time, a short time to service and that is less sensitive towards humidity.

Furthermore, it is desired that the floor coatings have a low volatile organic content for environmental and health reasons, in particular when applied in poorly ventilated circumstances, in particular indoor. This requirement is counteractive to achieving a higher fluidity and improved working time through the use of a volatile organic solvent. With volatile solvent herein is meant, unless otherwise described, the organic compounds having a boiling point lower or equal to 250° C. present in the composition ready for use as described by the EU "Paint Directive" 2004/42/EC.

Epoxy-amine floor coating systems have a further disadvantage that they typically cannot be cured at temperatures below 15° C. Too low curing temperature will result in poor mechanical properties of the cured coating. A further disadvantage of polyol-polyisocyanate floor coating systems is that, during the application, they are moisture sensitive. Therefore both prior art floor coating systems have particular significant disadvantages for application in outdoor floor applications where low temperatures and moist conditions frequently occur. Therefore there is a desire for floor coatings that can be more readily used in outdoor flooring applications, which actually also includes flooring in new constructions as there the outside ambient conditions usually also exist in-door.

A further desire is to provide a floor coating composition that can be applied directly to a fresh mineral substrate, in particular to fresh concrete without risk of moisture causing problems like blistering and poor adhesion. This would avoid the necessity to use a sealer coating layer which provides a significant cost reduction but also a significant advantage in shortening the time for finalizing the coating on such a concrete floor.

A floor coating is characterised by a set of high performance requirements that set them apart from other coating applications. Specifications are for example described in the EFNARC Specification for synthetic resin floorings. It is noted that different specifications can be found in different sources, but the following set of parameters are common in several standard as mandatory A-requirements for synthetic resin floorings: 1) Abrasion resistance, 2) Pull off strength to the substrate and 3) Impact resistance. Reference is made to EFNARC Specification for synthetic resin floorings (Table 2).

| Classification for intended use* | Performance characteristic | Specified test method | Requirement |
| --- | --- | --- | --- |
| A | Abrasion resistance | For systems exceeding 2 mm in thickness BCA Abrasion Tester to EN 13892-4 or Rolling Wheel tester to EN 13892-5 For systems less than 2 mm in thickness Taber Abrasion Tester to DIN 53 754 | Depth of wear shall not exceed 0.1 mm (Class AR1) Loss of volume shall not exceed 1.0 cm$^3$ (Class RWA1) Loss in weight shall not exceed 100 mg (1000 cycles/ CS10 wheels/ 1000 g load) |
| A | Pull off strength to the substrate | EN 1542, using reference concrete to EN 1766 (type MC 0.40) as substrate | >1.5 MPa: nature of failure to be reported |
| A | Impact resistance | EN ISO 6272, when bonded to a reference concrete of EN 1766, (type MC) | impact resistance >4 Nm with no cracking or debonding |

BRIEF DESCRIPTION OF THE INVENTION

There is a desire for a flooring coating composition that does not have one or more of the above mentioned disadvantages of the prior art, in particular a flooring composition that has one or more of the advantages of combining a long working time, allowing enough time for handling and levelling, with a short service time allowing the floor to be used quickly after it has been applied, a low volatile organic content in particular for use in-door, a low moisture sensitivity and curable at low temperatures for use out-door and that can be applied directly to a concrete substrate.

One or more of the above mentioned problems are solved by using a Real Michael Addition (RMA) crosslinkable composition for the preparation of floor coating compositions, said RMA crosslinkable composition comprising at least one crosslinkable component comprising reactive components A and B each comprising at least 2 reactive groups wherein the at least 2 reactive groups of component A are acidic protons (C—H) in activated methylene or methine groups, and the at least 2 reactive groups of component B are activated unsaturated groups (C=C) which reactive groups react to achieve crosslinking by RMA reaction between said at least one crosslinkable components in the presence of a base catalyst (C).

It has been found that RMA crosslinkable compositions have surprisingly good properties in floor coating applications in particular in application direct to a concrete floor and in certain other floor substrates and conditions.

Floor coatings with significantly longer pot life could be achieved having outstanding chemical resistance and abrasion resistance. The working time could be further improved without detriment to service time if the crosslinkable composition also comprises a reactivity moderator D comprising an X—H group that is also a Michael addition donor reactable with component B under the action of catalyst C, wherein X is C, N, P, O or S to improve open time. Preferably the crosslinkable composition also comprises an alcohol with 2 to 12 carbon atoms to improve potlife.

The RMA compositions were particularly successful for direct coating on concrete floors without a sealing layer, but can also be used for application of a top-coating over a conventional sealer layer which is based on one or more resins including epoxy, phenolic, silane, acrylics, polyurethane, polyurea, polyaspartic resins and their hybrids. Examples of uses are for coating wood floors, in particular gymnasium floors, vinyl floors, terrazo floors, cork floors, phenolic floors or a metal floor.

It was found that the RMA crosslinkable composition can be advantageously used for coating surfaces in out-door applications, in particular when temperatures are lower than 15° C. or the relative humidity higher than 85% RV or when the coating substrate surface is moist.

For indoor applications it was found advantageous that the RMA composition which would normally comprise amounts of volatile solvent is between 0 and 60, 50 or 40 wt % can contain a much lower amount of organic volatile solvent of less than 20, 15, 10, 5 and most preferably less than 2 or even 1 wt % relative to the total of the crosslinkable components A and B.

The invention further relates to novel RMA crosslinkable compositions for use in floor coating compositions with low VOC, in particular those including effective amounts of reactivity moderating component D, achieving long pot-life and short dry-to-touch time (or working time and service time), to compositions containing specific reactive solvents to reduce viscosity needed in particular for high filler contents without Quality, Environment, Safety and Health (QESH) issues. With reactive solvent herein is meant that components are low molecular weight components that act as solvent/diluent, hence reducing the need for Volatile organic solvent and a reactive in the crosslinking system so they get incorporated in the network on curing.

The invention further relates to RMA crosslinkable composition having low VOC for use in the preparation of a floor coating composition, which comprises at least one crosslinkable component comprising reactive components A and B each comprising at least 2 reactive groups wherein the at least 2 reactive groups of component A are acidic protons (C—H) in activated methylene or methine groups, and the at least 2 reactive groups of component B are activated unsaturated groups (C=C) which reactive groups react to achieve crosslinking by RMA reaction between said at least one crosslinkable components in the presence of a base catalyst (C) wherein the amount of volatile solvent is between 0 and 20, 15, 10, 5 and preferably even less than 1 wt % relative to the total of the crosslinkable components A and B.

The relative amounts of the crosslinkable components in the RMA crosslinkable composition are chosen such that the molar ratio of activated unsaturated reactive group C=C in reactive component B to the activated acidic reactive groups C—H in reactive component A is between 0.5 and 2 and preferably between 0.75-1.5 or 0.8-1.2.

The RMA crosslinkable composition preferably further comprises a reactivity moderator D comprising an X—H group that is also a Michael addition donor reactable with component B under the action of catalyst C, wherein X is C, N, P, O or S for improving open time or an alcohol with 2 to 12 carbon atoms for improving pot life or both and hence working time of application of the floor coating composition on a floor.

In view of QESH it is preferred that the RMA crosslinkable composition comprises one or more reactive solvents which react with crosslinkable components A or B. The one or more reactive solvents are preferably selected from the group of monomeric or dimeric components A, monomeric or dimeric components B, compounds A' having only 1 reactive acidic protons (C—H) in activated methylene or methine groups, compounds B' having only 1 reactive unsaturated groups (C=C), most preferably acetoacetate, malonate or an acryloyl. The total amount of volatile organic solvent plus reactive solvents is between 0, 1, 3, or 5 and 30 wt % and the volatile organic solvent is less than 5, 3 or even 1 wt % relative to the total weight of the RMA composition.

The reactive components A and B are preferably built into a polymer chain or pending or terminal pending on a polymer chain. Preferably, the one or more crosslinkable components are one or more polymers chosen from the group of polyesters, alkyds, polyurethanes, polyacrylates, epoxy resins, polyamides and polyvinyl resins which contain components A or B in the main chain, pendant, terminal or combinations thereof.

A preferred new resin was developed for use in the RMA crosslinkable resin which is a polymer that is modified with fatty acids, preferably an alkyd, which is modified with reactive components A in the main chain, pendant, terminal or combinations thereof. Examples of alkyds modified with malonate were tested and found to give excellent adhesion, good appearance, hardness, abrasion resistance and easy to clean properties. The invention also relates to the use of said resin for preparation of RMA crosslinkable composition, RMA crosslinkable compositions in general and floor coating compositions in particular comprising said resin. The composition was successfully tested for coating wood floors. Wood floors coated with floor coating compositions comprising the RMA crosslinkable composition have high abrasion resistance, but also high gloss, color warmth and hardness.

The RMA one or more crosslinkable components preferably are polymeric components generally with a weight average molecular weight Mw of at least 250 g/mol, preferably a polymer having Mw between 250, 300 and 15000, more preferably between 400 and 10000 or 500 and 10000 g/mol. Higher Mw is possible but not practical for most applications. In applications where low VOC is required, for example in high build floors, the viscosity of the composition may become to high to provide good flow and levelling of the coating and therefore the Mw of the one or more crosslinkable components is lower, polymeric components having a weight average molecular weight Mw of at least 250 gr/mol, preferably a polymer having Mw between 250, 300 and 5000, more preferably between 400 and 4000 or 500 and 3000 g/mol (as determined by GPC).

The viscosity of the crosslinkable polymer comprising component A (comprising the activated methylene or methine groups) as measured at 23° C. according to DIN EN ISO 3219/A.3, is from 100 to 50,000 mPa·s more preferably from 15,000 to 200 mPa·s, even more preferably from 10,000 to 200 mPa·s and most preferably from 4,500 to 300 mPa·s. The viscosity is that of the A-component before mixing with other components in the composition. Such low viscosity polymer is particularly suitable for low VOC composition in particular for high build flooring compositions.

Reference is made to EP2556108 and EP2764035 for detailed description of all components in the RMA crosslinkable composition A, B C or D, their preparation, the amounts used in the RMA crosslinkable composition as well as for measurement methods and definitions and the description thereof is hereby incorporated by reference. Most important features are described below in summary. It is preferred that reactive component A is malonate or acetoacetate and reactive component B is acryloyl. It is preferred that the one or more reactive components A in the crosslinkable component predominantly comprise one type of reactive components, predominantly meaning preferably more than 50, 75, 90 and most preferably 100% of the C—H reactive groups in crosslinkable component A are from one type of reactive component A, preferably from malonate or acetoacetate and most preferably consisting predominantly of malonate and acetoacetate or acetylacetone as the remainder component A.

The X—H group in component D, preferably an N—H group containing component, has a pKa (defined in aqueous environment) of at least one unit, preferably two units, less than that of the C—H groups in predominant component A, preferably the pKa of the X—H group in component D is lower than 13, preferable lower than 12, more preferably lower than 11, most preferably lower than 10; it is preferably higher than 7, more preferably 8, more preferably higher than 8.5.

The component D preferably comprises a molecule containing the N—H as part of a group —(C=O)—NH—(C=O)—, or of a group —NH—(O=S=O)— or a heterocycle in which the nitrogen of the N—H group is contained in a heterocyclic ring preferably chosen from the group of a substituted or unsubstituted succinimide, glutarimide, hydantoin, triazole, pyrazole, immidazole or uracil, preferably chosen from the group of succinimides and triazoles.

The component D is present in an amount between 0.1 and 10 wt %, preferably 0.2 and 7 wt %, 0.2 and 5 wt %, 0.2 and 3 wt %, more preferably 0.5 and 2 wt % relative to the total amount of the crosslinkable components A or B and component D. The component D is present in such amount that the amount of X—H groups in component D is no more than 30 mole %, preferably no more than 20, more preferably no more than 10, most preferably no more than 5 mole % relative to C—H donor groups from component A present in the crosslinkable polymer.

The invention also relates to a floor coating composition comprising the RMA crosslinkable composition described above, not including the catalyst C, for use in combination with a catalyst C to start the crosslinking reaction, and further floor coating additives. It is noted that the floor coating composition cannot be commercially available with catalyst C, but is for use in combination with a catalyst C to start the crosslinking reaction. The floor coating composition is mixed with the catalyst C shortly before the use in the process for making the floor coating. The floor coating composition and catalyst are combined as a kit of (unmixed separate) parts. The part that contains the catalyst C is also referred to as the hardener.

For a DABCO-epoxy catalyst, the kit of parts has one part having the DABCO and one part comprising the epoxy. The DABCO and epoxy react together to form the strong base on mixing of the parts of the at least 2 pack system. This helps pot life and open time as gradually after mixing, more and more active cat is formed.

The floor coating which can be a clear floor coating composition without pigments or filler, a pigmented floor coating composition or a high build floor coating composition comprising particulate filler (having course particles other than pigments).

The invention in particular relates to a floor coating composition for high build floor coatings comprising 50-95, preferably 55, 60 65 or 70 up to 95, 90, 85 or 80 wt % of a solid particulate filler, 5-50, preferably 10, 15 or 20 up to 50 wt % of a resin from the RMA crosslinkable composition, less than 100, preferably less than 75, 50 or 25 g/ltr volatile organic solvents, 0-20 wt % of a reactive solvent, wherein wt % is relative to the total weight of components a-d and wherein wt % b) is the sum of resin forming components A and B not including components a), c) or d). In that high build floor coating composition it is preferred that at least 50 wt % of the solid particulate filler has a diameter of between 0.5 and 20 mm. The advantage of the invention is that the highly filled composition can still be easily casted and levels well. The solid filler is one or more selected from the group of inorganic, wood, metal or polymer particles, for example sand, saw dust, gravel, pebbles, PVC chips, plastic waste recycle, sea shells, glass, gypsum.

As described the floor coating composition comprises catalyst C which is a strong base and mixed in only shortly before use of the flooring composition. The catalyst C can be a carbon dioxide blocked strong base catalyst, preferably a quaternary alkyl ammonium bi- or alkylcarbonate (as described in EP2556108). As this catalyst generates $CO_2$ it is preferred for use in coating layers with a thickness up to 500, 400, 300, 200 or 150 micrometer.

For floor coating compositions that are to be used in thick layers, in particular in high build and highly filled floor coating layers, the catalyst C is preferably a homogeneously active strong base catalyst, i.e. not of the surface deblocking type as described above. Preferably such catalyst is used in coating layers with a thickness from 150, 200 or 300 up to 2000, 1500, 1000 or 10,000 micrometer. An upper limit in thickness is in practice determined only by cost and intended use.

A suitable homogeneous catalyst C is the reaction product of an epoxide with a tertiary amine as described in EP0326723. The tertiary amine and epoxy components are combined during or shortly before combination of all components. Alternatively either the tertiary amine or epoxy are mixed with the combined components A and B and the remaining constituent of the catalyst is added thereto. The preferred epoxide components contain the epoxide group as glycidyl esters, glycidyl ethers, or epoxidation products of alpha olefins. A preferred tertiary amine is triethylene diamine.

A preferred homogeneous catalyst C is a salt of a basic anion X— from an acidic X—H group containing compound wherein X is N, P, O, S or C, and wherein anion X— is a Michael Addition donor reactable with component B and anion X— is characterized by a pKa(C) of the corresponding acid X—H of more than two units lower than the pKa(A) of the majority component A and being lower than 10.5. Details of this catalyst are described in WO2014166880A1, which is hereby incorporated by reference. This catalysts C is especially useful in applications in which there is no large surface available for allowing $CO_2$ to evaporate such as in the case of thick films applications.

In this case catalyst C is a salt according to formula Cat"1"X", wherein Cat"1" is a non-acidic cation, with no ability to inhibit the crosslinking reaction of components A and B. This implies that, if any protons are associated with the cation, their acidity does not exceed that of the dominant C—H functions in component A, by more than two units, preferably not more than 1 and more preferably not more than 0.5 pKa unit. Examples of useful cations include inorganic cations, preferably alkaline or alkaline earth metal cations, more preferably K+, Na+ and Li+, or organic cations like tetra-alkylammonium and tetra-alkylphosphonium salts, but also cations that do have a proton but are extremely non-acidic, for example protonated species of strongly basic organic bases as e.g. 1,8-Diazabicyclo[5.4.0]undec-7-ene (DBU), 1,5-Diazabicyclo[4.3.0]non-5-ene (DBN) or tetra-methylguanidine. These bases would be able to initiate the crosslinking reaction between components A and B but do not interfere with the reaction (inhibiting) in their protonated form.

An additional advantage of these catalyst components C is that they can be significantly less expensive than the known RMA latent base catalyst. For example, in most circumstances the cations that are required in carbon dioxide blocked latent base catalyst are of the tetra-alkylammonium type which are much more expensive. Because of the anion X— the salt component C has sufficient solubility even with simple and inexpensive cations like potassium.

Volatile organic solvents for use in RMA crosslinkable compositions are common coating solvents that do not contain acid impurities, typically alkylacetate (preferably butyl or hexyl acetate), alcohol (preferably C2-C6 alcohol), N-methylpyrrolidine, N-ethylpyrrolidine, Tamisolve N×G (commercially available from Eastman), glycolether, Dipropylene Glycol Methyl Ether, Dipropylene Glycol Methyl Ether, Propylene Glycol Methyl Ether Acetate, ketones etc In view of the fact that the RMA crosslinking reaction is base catalyzed acidic components should not be used in the composition such that the acid base reaction between catalyst C and A and optionally D is not interfered. Preferably the composition is free of acidic components.

The invention also relates to a process for the application of a floor coating comprising mixing the floor coating composition of the invention with the catalyst C and applying the ready to use floor coating composition to the substrate surface via spray, roller, squeegee, trowel, draw down bar, wire rod or by casting. The process is particularly advantageous if the substrate is a concrete floor, in particular a fresh cement-based floor and preferably no sealing layer is applied before application of the high build floor coating composition on the concrete.

The invention further relates to a kit of parts for preparation of high build floor coating composition comprising a filler part, comprising the solid filler particles, a resin part being a RMA crosslinkable composition as described above not containing catalyst C and a further part, containing catalyst C. The invention also relates to a process for making a high build floor coating comprising; 1) Providing the kit of parts described above, 2) Mixing the hardener part with the resin part separate or simultaneous with 3) Mixing the filler part, 4) Casting the obtained composition to cover a substrate surface with a layer of a thickness of between 1, preferably 2, 5 and 10 mm up to preferably 50, 40, 30 or 20 mm, preferably within a working time of said composition of preferably more than 2, preferably 3 or 4 hours, 5) Allowing leveling and curing of the composition at ambient conditions.

EXAMPLES

The following is a description of certain embodiments of the invention, given by way of example only. The first series of examples A relate to flooring compositions comprising a carbon dioxide blocked base catalyst (i.e. a salt of a quaternary ammonium and an alkyl-substituted carbonate) for use in relatively thin layers. The resin characteristics are shown in Table 1, the catalyst composition in Table 2 and the coating formulation (composition) in Table 3. The components A of the RMA crosslinkable composition used in the formulation were malonated polyesters and malonated alkyds. The components B of the RMA crosslinkable composition are trimethylolpropane triacrylate (TMPTA) or di-trimethylolpropane tetra-acrylate (DiTMPTA), which were mixed in the formulation as a pre-mix with the pigment paste or separately or both.

The second series of examples B relate to flooring compositions for use in relatively thick layers some using the same blocked catalyst as described above (Ex B3 and B7) but also another type of component A and also a different catalyst that does not generate carbon dioxide (DABCO epoxy). The floor coating composition characteristics are shown in Table 4. The component A of the RMA crosslinkable composition used in the formulations is an acetoacetate modified polyol and malonate modified polyesters. The component B of the RMA crosslinkable composition is DiTMPTA, which were mixed in the formulation as a pre-mix with the pigment paste or separately or both.

TABLE 1

Resin characteristics

| Malonated Resin | Malonated Polyester 1 | Malonated Polyester 2 | Malonated Alkyd 1 |
|---|---|---|---|
| % Solids | 85% | 100% | 99.5% |
| Viscosity (cps) | 7,500 | 5,000 | 10,000 |
| Color APHA | <100 | <100 | <300 |
| Equivalent Wt. (C—H)* | 180 | 171 | 175 |
| Acid Value (mg KOH/g) | <0.8 | <0.8 | <1 |

*based on resin solids

Malonated Polyester Resin 1 Preparation

Malonated polyester resin 1 is a polyester resin which has been trans-esterified with diethyl-malonate. This resin is prepared as follows: Into a reactor provided with a distilling column filed with Raschig rings were brought 382 g of neopentyl glycol, 262.8 g of hexahydrophthalic anhydride and 0.2 g of butyl stannoic acid. The mixture was polymerised at 240° C. under nitrogen to an acid value of 0.2 mg KOH/g. The mixture was cooled down to 130° C. and 355 g of diethylmalonate was added. The reaction mixture was heated to 170° C. and ethanol was removed under reduced pressure. The obtained resins were further cooled and diluted with butyl acetate to 85% solids.

Malonated Polyester Resin 2 Preparation

Malonated polyester resin 2 is a polyester resin which has been trans-esterified with diethyl-malonate. This resin is prepared as follows: Into a reactor provided with a distilling column filed with Raschig rings were brought 1804 g of neopentyl glycol, 1238 g of hexahydrophthalic anhydride and 1.0 g of butyl stannoic acid. The mixture was polymerised at 240° C. under nitrogen to an acid value of <1 mg KOH/g. The mixture was cooled down to 130° C. and 1353 g of diethylmalonate was added. The reaction mixture was heated to 180° C. and ethanol was removed at atmospheric pressure. The obtained resins had a final resin solids content of 90.0% in 10% diethyl malonate. The viscosity of the product is 22,100 cPs.

Malonated Alkyd 1

A three-liter, four-necked reaction flask equipped with a condenser, agitator, heating mantle, sampling tube, thermocouple attached to a thermowatch and toluene-primed Dean-Stark trap was charged with 349.91 parts coconut fatty acid, 395.47 parts trimethylolpropane, 62.73 parts pentaerythritol, 100.10 parts of phthalic anhydride, 93.60 parts of Adipic acid and 0.94 parts of dibutyltin oxide and sparged with nitrogen at 0.5 standard cubic feet per hour (SCFH) for 15 minutes without agitation followed by 15 minutes with agitation. The reaction mixture was then heated to 450-455° F., discontinuing the nitrogen flow at the onset of distillation. The mixture was held at 450-455° F. for an acid value of <1 adding toluene as needed to maintain a steady reflux. Once the acid value was reached, the mixture was cooled to 180° F. under a nitrogen blanket. 742.89 parts of dimethyl malonate were added to the reaction mixture, a packed column was added to the reactor and the Dean-Stark trap drained. The resin was heated to 330° F. and held until methanol distillation ceased. The nitrogen sparge was then increased to 2.0 SCFH to remove the azeotrope solvent and the resin cooled and filtered. The resulting malonate-functional resin contained 11.4% residual dimethyl malonate and had a Gardner-Holdt viscosity of Z1-Z2 with an acid value of 0.5 and an APHA color of 98. The number average molecular weight was 1490 with a weight average molecular weight was 8530.

The catalyst was prepared as described in EP2556108 (catalyst C5). The composition is in Table 2:

| Component | Catalyst 1 |
|---|---|
| Aqueous TBAH (55%) | 44.60 |
| DI Water | 4.90 |
| Diethyl carbonate | 20.10 |
| n-propanol | 30.40 |

Formulations A to F were prepared from the components mentioned in Table 3 by mixing the components and pre-dissolved components as indicated. The usual coating additives not explicitly identified and described are well known commercially available components for levelling, anti-foaming (Foamstar ST-2446), surfactants (Byk 310:315 1:4), colorants (Chroma Chem 844-9955), surface modifiers (Silmer ACR-D2).

Example A 1

200 grams of Formulation A was mixed with 4.1 grams of Catalyst 1 and then rolled onto a concrete floor. The Formulation was thoroughly dry after 30 minutes with a dry film thickness of 75 microns. The potlife of the mixed Formulation was more than 4 hours. The next day adhesion was determined to be very good using the cross-cut adhesion test as described in ASTM D3359. Adhesion was also tested per ASTM D7234; failure was within the concrete at over 800 psi. The coatings passed 100+ MEK double rubs and passed the 24 hours Skydrol spot test.

200 grams of Formulation A was mixed with 4.1 grams of Catalyst 1 and then trowelled onto a concrete floor. The Formulation was thoroughly dry after 30 minutes.

200 grams of Formulation A was mixed with 4.1 grams of Catalyst 1 and then applied to a concrete floor using a squeegee. The Formulation was thoroughly dry after 30 minutes.

200 grams of Formulation A was mixed with 4.1 grams of Catalyst 1 and then applied to freshly poured concrete that was 24 hours old using a brush. The Formulation was thoroughly dry after 30 minutes. The next day adhesion was determined to be very good using the cross-cut adhesion test as described in ASTM D3359.

TABLE 3 the Formulations A to H

| Component | A | B | C | D | E | F | G | H |
|---|---|---|---|---|---|---|---|---|
| Malonated polyester 1 | 28.72 | 63.31 | 0 | 0 | 0 | 0 | 0 | |
| Malonated polyester 2 | | | | | | | 65.29 | 63.61 |
| Malonated Alkyd 1 | 0 | 0 | 12.11 | 43.85 | 57.22 | 38.52 | 0 | 0 |
| Acetoacetate functional TMP *1 | 0 | 0 | 3.93 | 7.71 | 0 | 6.80 | 0 | 0 |
| Pigment paste 1 * | 48.53 | 0 | 0 | 0 | 0 | 0 | 0 | 0 |
| Pigment paste 2 ** | 0 | 0 | 46.49 | 0 | 0 | 0 | 0 | 0 |
| Miwon Miramer M410 *2 | 0.53 | 0 | 0 | 0 | 0 | 17.55 | 0 | 0 |
| Miwon Miramer M300 *3 | 0 | 31.23 | 16.62 | 32.67 | 28.89 | 14.37 | 34.71 | 33.82 |
| Pre-dissolve: | | | | | | | | |
| 1,2,4-triazole | 0.42 | 0 | 0 | 0 | 0 | 0 | 0 | 0 |
| n-propanol | 6.04 | 0 | 0 | 0 | 0 | 0 | 0 | 0 |
| Pre-dissolve: | | | | | | | | |
| 1,2,4-triazole | 0 | 0 | 0.43 | 0 | 0 | 0 | 0 | 0.97 |
| n-Methyl pryrrolidone | 0 | 0 | 0.69 | 0 | 0 | 0 | 0 | 3.06 |
| Pre-dissolve: | | | | | | | | |
| Succinimide | 0.20 | 0 | 0 | 0 | 0 | 0 | 0 | 0 |
| n-Methyl pryrrolidone | 1.62 | 0 | 0 | 0 | 0 | | 0 | 0 |
| Subsequently add | | | | | | | | |
| n-Butyl Acetate | 2.41 | 0 | 0 | 5.13 | 4.52 | 0 | 0 | 0 |
| n-Butanol | 0 | 0 | 0 | 10.02 | 8.82 | 8.50 | 0 | 0 |
| Glycerin | 0 | 0 | 0 | 0.26 | 0.23 | 0 | 0 | 0 |
| Foamstar ST-2446 | 0 | 0 | 0 | 0.32 | 0.28 | 0 | 0 | 0 |
| Byk 310: 315 1:4 | 0.24 | 0 | 0 | 0 | 0 | 0 | 0 | 0 |
| Chroma Chem 844-9955 | 0.89 | 0 | 0.8 | 0 | 0 | 0 | 0 | 0 |
| Silmer ACR-D2 | 0.06 | 0.13 | 0.10 | 0.05 | 0.04 | 0.11 | 0 | 0 |
| Dimethyl carbonate | 5.17 | 0 | 0 | 0 | 0 | 0 | 0 | 0 |
| Hexyl acetate | 5.17 | 0 | 18.83 | 0 | 0 | 0 | 0 | 0 |
| Methyl Amyl Ketone | 0 | 0 | 0 | 0 | 0 | 8.50 | 0 | 0 |
| Mineral Spirits | 0 | 0 | 0 | 0 | 0 | 5.66 | 0 | 0 |

* Pigment Paste 1 mix 32.0% of Miramer M410 with 65.1% of Kronos 2310 (*4) and 2.9% of Disperbyk 163 and grind until the particle size is smaller than 10 μm
** Pigment Paste 1 mix 22.3% of Malonate functional alkyd with 74.53% of Kronos 2310, 2.98% of Disperbyk 163, and 0.18% of FC-4430 then grind until the particle size is smaller than 10 μm
*1 TMP is trimethylolpropane
*2 Miwon Miramer M410 is Di-TMPTA (Di-Trimethylolpropanetetra acrylate) component B
*3 Miwon Miramer M300 is TMPTA (Trimethylolpropane Triacrylate) component B
*4 Kronos 2310 is titanium dioxide

Example A 2

200 grams of Formulation B was mixed with 10.7 grams of Catalyst 1 and then trowelled onto a concrete floor. The Formulation was thoroughly dry after 30 minutes with a dry film thickness of 75 microns.

200 grams of Formulation B was mixed with 10.7 grams of Catalyst 1 and then cast into a metal substrate. The Formulation was thoroughly dry after 30 minutes and was measured to be 2,000 μm thick without any inclusion of bubbles.

Example A 3

200 grams of Formulation C was mixed with 4.8 grams of Catalyst 1 and then rolled onto a concrete floor. The Formulation was thoroughly dry after 30 minutes with a dry film thickness of 75 microns. The next day adhesion was determined to be very good using the cross-cut adhesion test as described in ASTM D3359.

200 grams of Formulation C was mixed with 4.8 grams of Catalyst 1 and then trowelled onto a concrete floor. The Formulation was thoroughly dry after 30 minutes.

200 grams of Formulation C was mixed with 4.8 grams of Catalyst 1 and then brushed onto a wood floor. The Formulation was thoroughly dry after 30 minutes. The resulting coating has a gloss of 85+ on a 20 degree angle gloss meter, excellent brilliance and wood warmth and a high abrasion resistance.

Example A 4

200 grams of Formulation D was mixed with 9.5 grams of Catalyst 1 and then rolled onto a concrete floor. The Formulation was thoroughly dry after 30 minutes with a dry film thickness of 75 microns. The potlife of the mixed Formulation was more than 4 hours. The next day adhesion was determined to be very good using the cross-cut adhesion test as described in ASTM D3359. Adhesion was also tested per ASTM D7234; failure was within the concrete at over 900 psi. The coatings passed 100+ MEK double rubs and hence shows good chemical resistance.

200 grams of Formulation D was mixed with 9.5 grams of Catalyst 1 and then trowelled onto a concrete floor. The Formulation was thoroughly dry after 30 minutes.

200 grams of Formulation D was mixed with 9.5 grams of Catalyst 1 and then squeegeed onto a wood floor. The Formulation was thoroughly dry after 30 minutes.

200 grams of Formulation D was mixed with 9.5 grams of Catalyst 1 and then sprayed onto a vinyl floor. The Formulation was thoroughly dry after 30 minutes

Example A 5

200 grams of Formulation D was mixed with 9.5 grams of Catalyst 1 and then rolled over a terrazzo floor. The coating had a 20° gloss of 85+ with good appearance of colors.

Example A 6

200 grams of Formulation F was mixed with 9.5 grams of Catalyst 1 and then rolled onto a wood floor. The Formulation was thoroughly dry after 50 minutes with a dry film thickness of 75 microns. The pot life of the mixed Formulation was more than 4 hours. The next day adhesion was determined to be very good using the cross-cut adhesion test as described in ASTM D3359. The coating had a 20° gloss of 85, a Konig Pendulum hardness of 98, and passed 400 MEK double rubs and hence shows good chemical resistance.

Example B1

Modified Castor Oil Based Polyol

In a round bottomed flask, equipped with a stirrer, heating mantle and distillation column, 250 grams of Setathane D 1150, a castor oil based polyol, commercially available from Nuplex Resins GmbH, 89.80 grams of ethyl acetoacetate were added together with 0.11 grams of Fascat 4100, a tin-based catalyst obtainable from PMC Organometallix. The mixture was heated under nitrogen sparge and ethanol started distilling a temperature of about 160° C. 28 grams of alcohol was collected. The reaction product was cooled down to room temperature. It was a clear, amber colored liquid with a hydroxyl value of 14 mg KOH/g and a viscosity of 3,450 cPa·s. Molecular weights were determined using size exclusion chromatography: $M_n$=1590 and $M_w$=2530. Methylene equivalent weight was 446 g.

Example B 2

Blocked TBAH Catalyst Solution in Iso-Propanol

A catalyst solution was prepared by mixing 80.30 grams of tetrabutylammonium hydroxide (55% aqueous solution) with 67.40 grams of iso-propanol and 110.50 grams of diethyl carbonate.

Example B 3

Self-Levelling Flooring Compound

In a vacuum dissolver, the ingredients given in table 1 were stirred at a speed of approximately 5 m/s in a vacuum below <200 mbar until a fineness below 20 micron is obtained. The vacuum is released and the compound is homogenized for another 3 minutes.

Table 1. Self-Levelling Flooring Compound.

Table 1 describes the components of the self-levelling flooring compound. Resin example B1 is 2 times in Table 1 as it was added in 2 separate steps. One before and one after the pigment dispersing step.

| | |
|---|---:|
| Resin from Example B 1 | 900.00 |
| Barytes EWO* | 1,280.00 |
| Tronox R-KB-2** | 148.00 |
| Bayferrox 130M*** | 15.40 |
| Bayferrox 920*** | 25.10 |
| Resin from example B 1 | 300.00 |
| Dynoadd 711**** | 3.74 |
| Di-trimethylolpropane tetracrylate | 500.00 |
| Benzotriazole (8.5% in methyl ethyl ketone) | 164.00 |

*Sachtleben Chemie GmbH
**Tronox Limited
***Lanxess AG
****Dynea

To this compound the catalyst solution from Example B 2 was added in three different concentrations: 3.5, 7.0 and 10.4%. Films were applied onto glass plates and using a BK drying recorder the time required for the compound to gel was determined. This time was respectively: 90, 20 and 15 minutes. This indicates that the working time of the self-levelling compound can be tuned by selecting the appropriate concentration of catalyst.

The compounds were also poured in a polyethylene dish at a thickness of 5 mm and left to cure overnight. After being removed from the polyethylene dish, a flexible elastomeric coating was obtained.

Example B 4

Low Solvent Strong Base Catalyst

To 64.00 grams of Cardura E10P (glycidyl ester of a highly branched saturated carboxylic acid containing 10 carbon atoms obtainable from Momentive), 90 grams of DABCO 33LV (a mixture of 33% triethylene diamine and 67% dipropylene glycol obtainable from Air Products) were added to obtain a strong base catalyst solution in dipropylene glycol.

Example B 5

Self-Levelling Flooring Compound

Similar to the procedure given in Example B 3, a self-levelling flooring compound was prepared by mixing the ingredients given in table 1, but omitting the benzotriazole solution. To this compound, the low solvent strong base catalyst solution from Example B 4 was added in three different concentrations: 2.8, 5.5 and 8.3%. Films were applied onto glass plates and using a BK drying recorder the time required for the compound to gel (phase II) was determined. This time was respectively: 240, 90 and 60 minutes. This indicates that the working time of the self-levelling compound can be tuned by selecting the appropriate concentration of catalyst. The compounds were also poured in a polyethylene dish at a thickness of 5 mm and left to cure overnight. After being removed from the polyethylene dish, a flexible elastomeric coating was obtained.

Example B 6

Solvent-Free Malonate Modified Polyester Resin

In a reactor, equipped with a stirrer, heating mantle and distillation column, 3608 grams of neopentyl glycol and 2476 grams of hexahydro phthalic anhydride together with 400 grams of water and 2.06 grams of dibutyl tindioxide were mixed and heated to 240° C. under nitrogen sparge. The esterification was continued until an acid value of 0.63 mg KOH/g was found. The contents of the reactor were cooled down to 120° C. and 3346 grams of diethyl malonate were added. The contents of the reactor were heated and ethanol was distilled off. In total 1566 g of ethanol distillate was recovered. The resulting malonate modified polyester resin was a clear, slightly yellow viscous liquid. Molecular weights were determined using size exclusion chromatography: $M_n$=1751 and $M_w$=3341. The contents of the reactor were further diluted with 836 grams of diethyl malonate, acting as a reactive diluent.

Example B 7

White Floor-Coating

In a high speed disperser, 160 grams of di-trimethylolpropane tetracrylate, 140 grams of the resin from Example B 6, 20 grams of Disperbyk 163 (obtainable from Byk-Chemie GmbH) and 620 grams of Kronos 2310 (titanium dioxide from Kronos Inc.) were dispersed until a fineness below 20 micron was obtained. To this mixture an additional 170 grams of di-trimethylolpropane tetracrylate and 314 grams of the resin from Example B 6 and 22 grams of a 15% solution of 1,2,4 triazole in n-propanol were added under low shear mixing conditions.

A low-solvent catalyst solution was prepared by mixing 57 grams of tetrabutyl ammonium hydroxide (55% solution in water) with 15 grams of diethyl carbonate. An additional 28 grams of demineralized water was added to prevent crystallization of the catalyst.

To the white floor-coating, 5.25% of the catalyst solution described above was added under mixing.

Applied to a glass panel at a wet layer thickness of 125 micron, the coating was hard-dry after 30 minutes. Persoz hardness after 90 minutes was 90 seconds, after 165 minutes it was 141 seconds. The coating, kept in a container with a closed lid was still liquid after two hours. The coating was also roller applied direct onto concrete slabs, both dry and wet. Again the coating dried hard in 30 minutes irrespective of the humidity of the substrate. A second coat of the same formulation could be applied after 90 minutes without distorting the previous coat. A third coat could be applied after 150 minutes and dried hard in 30 minutes. Consequently it is possible to build-up a floor-coating in only 5 hours.

The coating was also applied on both aged polyurethane and epoxy coatings after sanding the surface. Both dry and wet adhesion, tested according to Gitterschnitt (DIN EN ISO 2409) was perfect (Gt=0).

Example B 8

Low VOC Self-Levelling Flooring Compound

A compound was made according to Example B 7, but without the 1,2,4 triazole solution. This compound was mixed with 8.8% of the low solvent strong base catalyst from Example B 4.

The compound was cast in a polyethylene dish at a layer thickness of 4 mm. The compound dried to a Shore D hardness of 78 after 4 hours. Overnight the Shore D hardness was 90.

Example B 9

Low VOC Self-Levelling Flooring Compound 100 grams of Formulation G was mixed with 5.7 grams of Catalyst 1 and then cast into an aluminum pan. The Formulation was thoroughly dry after 10 minutes. The potlife of the mixed Formulation was less than 1 hour. The next day the thickness of the casting was measured to be 6 mm and was determined to be free of bubbles. The self-levelling compound was thoroughly cured at the bottom.

Example B 10

Low VOC Self-Levelling Flooring Compound 100 grams of Formulation H was mixed with 5.5 grams of Catalyst 1 and then cast into an aluminum pan. The Formulation was thoroughly dry after 30 minutes. The potlife of the mixed Formulation was over 1 hour. The next day the thickness of the casting was measured to be 4 mm and was determined to be free of bubbles. The self-levelling compound was thoroughly cured at the bottom.

Example B 11

Low VOC Flooring Compound 100 grams of Formulation H was diluted with 10 grams of butyl acetate and mixed with 5.5 grams of Catalyst 1. The formulation was rolled on an outside concrete surface when the substrate temperature was 10° C. The Formulation was thoroughly dry after 2 hours. The potlife of the mixed Formulation was over 1 hour.

Example B 12

Low VOC Flooring Compound 100 grams of Formulation H was mixed with 5.5 grams of Catalyst 1 and then rolled on a concrete surface and placed in an environmental chamber at a relative humidity of 90%. The Formulation was thoroughly dry after 4 hours. The dry film thickness was 50 microns. The potlife of the mixed Formulation was over 1 hour.

What is claimed is:

1. A process for the application of a floor coating comprising mixing a floor coating composition with a base catalyst C and applying the obtained ready to use floor coating composition to a surface of a floor,
   wherein the floor coating composition is a Real Michael Addition (RMA) crosslinkable composition comprising at least one crosslinkable component comprising reactive components A and B each comprising at least 2 reactive groups wherein the at least 2 reactive groups of reactive component A are acidic protons (C—H) in activated methylene or methine groups, and the at least 2 reactive groups of reactive component B are activated unsaturated groups (C=C) which reactive groups react to achieve crosslinking by RMA reaction between said at least one crosslinkable components in the presence of the base catalyst (C),
   wherein the crosslinkable component comprising reactive component A is a polymer that is modified with fatty acids and is modified with reactive components A in the main chain, pendant, terminal or combinations thereof,
   wherein the viscosity of the crosslinkable polymer comprising reactive component A as measured at 23° C. according to DIN EN ISO 3219/A.3, is from 15,000 to 200 mPa·s and
   wherein the crosslinkable component comprising reactive component A has a weight average molecular weight Mw between 500 and 10000 g/mol.

2. The process according to claim 1 wherein applying the floor coating composition to a surface of a floor comprises direct coating the composition on a concrete floor without an underlying sealing layer.

3. The process according to claim 1 wherein applying the floor coating composition to a surface of a floor comprises coating the composition on a floor surface in an out-door application when temperatures are lower than 15° C. or the relative humidity higher than 85% RV or when the floor surface is moist.

4. The process according to claim 1 wherein the RMA crosslinkable composition comprises an amount of volatile solvent is between 0 and 20 wt. % relative to the total of the crosslinkable components A and B.

5. The process of claim 4 wherein the RMA crosslinkable composition comprises one or more reactive solvents selected from the group of monomeric or dimeric components A having only 1 reactive acidic protons (C—H) in activated methylene or methine groups.

6. The process of claim 4 wherein the RMA crosslinkable composition comprises a total amount of volatile organic solvent plus reactive solvents between 0 and 30 wt % and the volatile organic solvent is less than 5 wt % to the total weight of the RMA crosslinkable composition.

7. The process of claim 1 wherein RMA crosslinkable composition comprises one or more crosslinkable components chosen from the group of polyesters, alkyds, polyurethanes, polyacrylates, epoxy resins, polyamides and polyvinyl resins which contains component A in the main chain, pendant, terminal or combinations thereof.

8. The process of claim 1 wherein the reactive component A is malonate or acetoacetate and reactive component B is acryloyl.

9. The process of claim 1 wherein more than 50, % of the C—H reactive groups in crosslinkable component comprising reactive component A are from malonate or acetoacetate.

10. The process of claim 1 wherein the RMA crosslinkable composition further comprises floor coating additives.

11. The process of claim 1 wherein catalyst C is a quaternary alkyl ammonium bi- or alkylcarbonate for use in coating layers with a thickness up to 500, 400, 300, 200 or 150 micrometer.

12. The process of claim 1 wherein the RMA crosslinkable composition further comprises a reactivity moderator D comprising an X—H group that is also a Michael addition donor reactable with component B under the action of catalyst C, wherein X is C, N, P, O or S, wherein the X—H group in component D has a pKa (defined in aqueous environment) of at least one unit less than that of the C—H groups in the reactive component A.

13. The process of claim 1 including the step of application of a top-coating over a conventional sealer layer which is based on one or more resins including epoxy, phenolic, silane, acrylics, polyurethane, polyurea, polyaspartic resins and their hybrids.

14. The process according to claim 1 wherein applying the floor coating composition to a surface of a floor comprises coating the composition on a wood floor, vinyl floor, terrazo floor, cork floor, phenolic floor or metal floor.

15. The process of claim 1 wherein the crosslinkable composition comprises one or more reactive solvents selected from the group of monomeric or dimeric components B, having only 1 reactive unsaturated group (C=C).

16. The process of claim 1 wherein RMA crosslinkable composition comprises one or more crosslinkable components chosen from the group of alkyds with a weight average molecular weight Mw between 500 and 10000 g/mol.

17. The process of claim 1 wherein more than 50% of the C—H reactive groups in crosslinkable component comprising reactive component A are from malonate and the remainder of the C—H reactive groups in crosslinkable component A comprising reactive component A are from acetoacetate or acetylacetone.

18. The process of claim 12 wherein the X—H group in component D is an N—H group containing component.

19. The process of claim 1 wherein the floor coating composition comprising the RMA crosslinkable composition is applied to the floor surface via spray, roller, squeegee, trowel, draw down bar, wire rod or by casting.

20. The process according to claim 1 including the step of coating surfaces in out-door applications when temperatures are lower than 15° C. or the relative humidity higher than 85% RV.

* * * * *